United States Patent

[11] 3,607,442

[72] Inventor Harvey J. Hall
 1730 Steele Blvd., Baton Rouge, La. 70808
[21] Appl. No. 823,752
[22] Filed May 12, 1969
[45] Patented Sept. 21, 1971

[54] BATTERY WITH GALVANIC TERMINAL POST PROTECTOR
 10 Claims, 6 Drawing Figs.

[52] U.S. Cl. .................................................... 136/181, 136/163, 204/197
[51] Int. Cl. .......................................................... H01m 5/02
[50] Field of Search ............................................ 136/135, 163, 181; 204/196, 197, 148; 21/2.5

[56] References Cited

UNITED STATES PATENTS

| | | | |
|---|---|---|---|
| 1,728,319 | 9/1929 | Wilson | 136/181 UX |
| 1,999,870 | 4/1935 | Douglas | 136/163 |
| 2,013,219 | 9/1935 | Peterson | 136/163 |

FOREIGN PATENTS

| | | | |
|---|---|---|---|
| 523,233 | 2/1956 | Canada | 136/181 |

OTHER REFERENCES

Galvanic Corrosion, Product Engineering, pages 176 and 177, published by The International Nickel Company, Inc., 67 Wall Street, New York, April, 1943, copy in 136-163.

Primary Examiner—Donald L. Walton
Attorney—John F. Sieberth

ABSTRACT: Means for improving the performance characteristics of acid batteries are described. Use of particular metallic shields to ward off battery acid attack of the terminal connection lengthens effective battery life, enhances battery reliability and reduces corrosion of the terminal connection.

PATENTED SEP21 1971                                     3,607,442

INVENTOR.
HARVEY J. HALL
BY John J. Lieberth
ATTORNEY

BATTERY WITH GALVANIC TERMINAL POST PROTECTOR

This invention relates to improving the performance of storage batteries containing acidic electrolytes, such as sulfuric acid. More particularly, this invention is concerned with improvements associated with the terminal connections of such batteries.

BACKGROUND

Acidic electrolytes commonly used in electric storage batteries tend to accumulate on the top of the battery in what appears to be a film or beads of dampness. Although this accumulation frequently becomes dust laden, it nonetheless spreads quite rapidly and of course is highly corrosive.

This accumulation of battery acid is due to a variety of causes which are not readily susceptible to uniform control. For example, in severe cases the presence of the acid on the exterior surface of the battery may result from an ill-fitting post in the top of the battery case. Also, as the battery is being charged bubbling or "boiling" of electrolyte may occur and cause entrainment of acid droplets in air escaping through the vent holes. Another related cause of acid accumulation arises when an improperly adjusted voltage regulator causes overcharging with resultant bubbling of the electrolyte. Still other causes include severe jolting or shaking of the battery such as may occur when driving a vehicle over an excessively rough surface, improperly replaced filler caps, the addition to the cells of too much water, and the like.

The consequences of acid attack of terminal connections are particularly undesirable. For one thing, the attack often results in gradual disintegration of the terminals, the cable connectors, and the associated parts. In severe cases, these items may become sufficiently corroded that a proper electrical connection between them is no longer possible. Another adverse consequence which is frequently encountered is the difficulty in loosening the nut on the cable clamp to free the clamp from the terminal post, an operation involved when the battery is to be removed for recharging, repair, or replacement.

All of the foregoing manifestations of battery acid attack are readily perceptible to those who take the time and trouble to inspect the terminal connections for evidence of acid attack. Indeed these adverse manifestations might be largely avoided by frequent proper servicing of the battery. However, as pointed out in U.S. Pat. No. 2,801,276 and U.S. Pat. No. 3,224,906, proper care of the battery and its associated parts is the exception rather than the rule.

My studies of the problem have revealed still another adverse consequence of acid attack which, unlike those discussed above, occurs insidiously and with little or no visible evidence that anything untoward is happening until it strikes without warning. In particular, a battery appearing free from corrosion at the terminal connections may suddenly "give out" when an attempt is made to start the vehicle. Undoubtedly a large percentage of calls to service station attendants come about when the motorist, whose car has been starting and performing as though nothing were wrong, suddenly finds out without warning and to his dismay that the engine will not turn over when he tries to start the car. Some may wryly suggest that this may be expected to happen once the warranty period on the battery has expired. But in actuality, this is a common experience which often results in the motorist purchasing a new battery or undergoing other expenses when in reality it is not necessary for him to do so.

A welcome contribution to the art would be an effective means of preventing, or at least reducing the frequency of, the foregoing difficulties. This invention is believed to represent such a contribution.

THE DRAWING

In the accompanying drawing are depicted preferred embodiments of this invention which, of course, may be modified in accordance with the ensuing description and appended claims without departing from the spirit of the invention described.

THE INVENTION

In accordance with this invention the above and other related difficulties associated with battery acid attack of terminal connections are overcome in a simple, efficient, and economical fashion. In general, this invention involves establishing and maintaining a direct physical contact between at least one of the metallic members of the terminal connection to be protected and a protection device fabricated from a metal higher in the electromotive series than the metal from which said members are made. More particularly, this invention involves positioning about the base of the terminal post in proximity to the battery casing a snugly fitting shield of a metal higher in the electromotive series than the metal from which the post is fabricated. In other words, for best results there is positioned between the terminal connection and the battery acid source a tightly fitted metallic shield where the principal metal or entire metal of the shield is higher in the electromotive series than the principal or entire metal of the terminal post. Inasmuch as it is common practice to employ lead or lead alloys in the fabrication of battery terminal posts and cable connectors, the metal used in the fabrication of the shields of this invention will normally fall above lead in the electromotive series.

Particularly useful metals for use in fabricating the shields are aluminum, magnesium, zinc, and their alloys such as aluminum-silicon alloys, aluminum-magnesium alloys, aluminum-silicon-titanium alloys, aluminum-silicon-zinc alloys, magnesium-zinc alloys, aluminum-magnesium-zinc alloys, and the like. Ordinarily, commercially available aluminum sheeting approximately one-sixteenth inch in thickness is a particularly inexpensive and highly satisfactory material for this use. Indeed, for several reasons which will appear hereinafter, shields made from aluminum constitute a particularly preferred embodiment of this invention.

Figure 3:
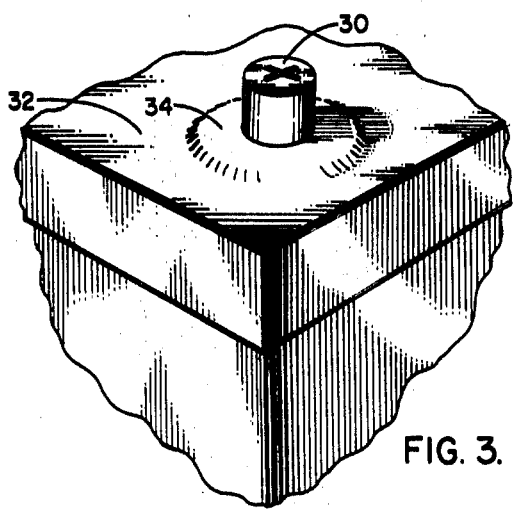
FIG. 3 is a perspective view of a portion of a battery showing one of the terminals thereon.

Referring to the Drawing, a shield of this invention is typically provided in the form of a generally flat, relatively thin member 20 having an aperture 22 therein. The aperture is sized to effect an interference fit with the lower circumference of the terminal post 30 in proximity to the casing of the battery 32. As shown in FIG. 3, the battery as manufactured will oftentimes be provided with a flange 34 just above the upper surface of the battery casing and in this situation the shield of this invention is preferably sized to snugly fit about the base of the post just above the top of this flange. On the other hand, the top of the battery about the post may be recessed to accommodate the shield so that the top of the shield is either flush with or at some other desired elevation relative to the top of the battery. The shields may thus be built into the battery as originally supplied or they may be added as auxiliary equipment.

Shields made from aluminum are particularly advantageous because of the fact that aluminum is harder than lead—the metal from which the terminal posts are usually made. This extra hardness enable the shield to form a particularly snug press fit through downward displacement of some of the lead when the shield is pressed down around the post. Also, when drilling or punching the apertures in aluminum during the manufacture of the shields, there can readily be formed a relatively sharp edge around the circumference of the aperture to still further enhance the ability of the shield to be seated tightly about the base of the post. Furthermore, some manufacturers utilize brass in the connectors and aluminum is higher in the electromotive series than the ingredients of brass.

Insofar as size is concerned, the shields will be sized to cover the upper surface of the battery casing for a suitable distance around the terminal post. Naturally the shield will be shaped, sized and positioned so as not to produce an electrical short circuit or to unduly interfere with filler caps or the like.

Figure 2:
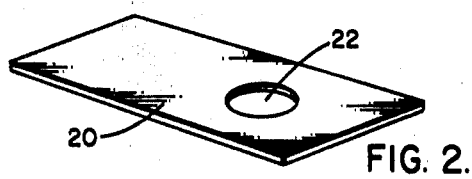
FIG. 2 is a perspective view of a preferred shield member of this invention.
Figure 4:
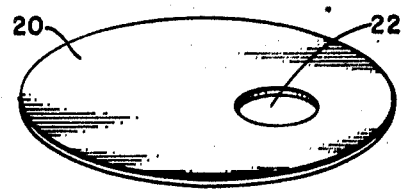
FIG. 4 depicts in perspective another form of protective device of this invention.
Figure 5:
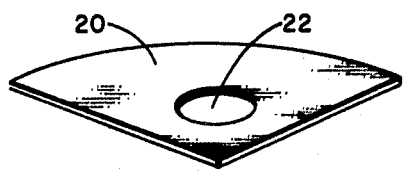
FIG. 5 is illustrative of yet another shape in which the protection devices of this invention may be fabricated and used.
Figure 6:
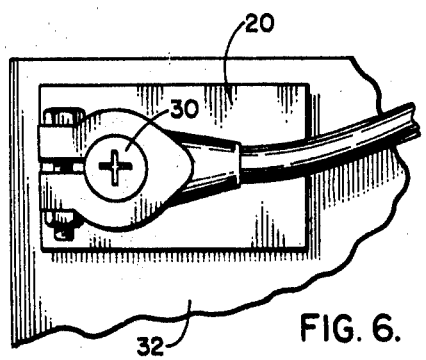
FIG. 6 is a top view of a portion of a battery showing a typical connection fitted with a preferred shield member of this invention.

As is evident from FIGS. 2, 4, and 5, the shape of the shields is susceptible to variation. Thus, the shield may be square, circular, elliptical, or of any other suitable shape. The aperture may be positioned at any suitable place in the shield although it is preferred to have the aperture somewhat off center so that a portion of the shield will extend or protrude beyond the edge of the connector—note FIG. 6. This enables the extent of shield corrosion to be more readily perceived by visual examination. Shields having a rectangular configuration as depicted in FIG. 2, especially where the aperture is essentially equidistant from three sides thereof, are very simple to manufacture and are readily accommodated on commercial batteries of current design.

As an example of this invention, rectangular shapes approximately 2¼ inches long and approximately 1½ inches wide are cut from aluminum sheeting one-sixteenth inch thick. An aperture is punched into these rectangular coupons so that its center is approximately three-fourths inch from the two long sides and one of the short sides of the rectangle. In shields for use with present day vehicular storage batteries, this aperture should be three-fourths inch in diameter for the positive terminal whereas the shields used on the negative terminal will have an aperture five-eighths inch in diameter. For best results, the walls around the periphery of the aperture are beveled to the extent of about 0.5 millimeter from perpendicular.

Figure 1:
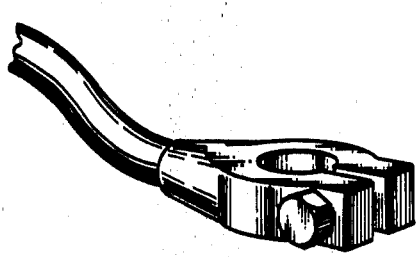
FIG. 1 is a perspective view of a typical form of cable connector for battery terminals.

To use the shields of this invention the cable connector (FIG. 1) is removed and if necessary, the connector and the terminal post (FIG. 3) are cleaned and dried. Then a shield of this invention is suitably positioned and fitted snugly about the base of the post and then the cable connector is replaced on the terminal post and tightly clamped thereon. For best results the connector will also be pressed down tightly onto the top of the shield upon which the connector is superposed. Usually a shield will be used on each of the terminal posts, although it may be sufficient to protect only the connection tending to undergo the greater amount of acid attack.

As noted above, the shields of this invention have the capability of extending battery life and reducing the frequency of service calls caused by the sudden inability of the battery to cause the engine to turn over. An attempt has been made to develop a satisfactory explanation of this highly beneficial behavior.

Without desiring to be bound in any way as to theoretical mechanisms by which the shields of the present invention function, it is believed on the basis of my studies and observations that in the presence of battery acid (commonly sulfuric acid) a localized electrolytic action normally tends to take place between the abutting surfaces of the terminal posts and the connector.

It is theorized that this adverse localized galvanic action is able to occur because the composition (considering impurities, alloying ingredients or the like) of the lead or other metal used in fabricating the terminal post differs from the composition of the lead or other metal used in fabricating the connector. My studies indicate that such localized electrolytic action, which cannot readily be seen inasmuch as it occurs between the hidden interface of these metallic parts, causes the formation of a film at the interface. It further appears that when this film reaches a particular stage of development, the normal flow of electricity through the interface of the united parts can no longer occur. According to this hypothesis the use as a shield of a metal higher in the electromotive series than the metals of the terminal posts and the connector results in suppression of this undesirable localized electrolytic action, the shield, inter alia, serving as a sacrificial electrode—i.e., a sacrificial anode. In other words, since the shield is in electrical contact with the metallic terminal post and its connector and since the metal in the shield is higher in the electromotive series than the metal in the post and the connector, localized galvanic corrosion at the common interfaces of post and connector is suppressed or eliminated. When considered in line with this hypothesis, the shields of this invention may thus be thought of as anodes. As noted, the foregoing explanation is presented solely as an aid to a fuller understanding of this invention, its practice and its advantages. This invention is not to be limited to any particular mode of action or theoretical considerations. The point is that this invention has been found in actual practice to significantly extend the useful life of ordinary vehicular storage batteries as compared to comparable batteries not equipped with the shields of this invention.

Besides significantly lengthening the time required for the battery to suddenly "give out," the shields, when used in accordance with this invention, exert other advantageous properties. For example, the positioning of the shield between the terminal connection and the acid source results in the shield intercepting the acid and thereby converting most of the acid into a salt before it even reaches the terminal connection. Thus, a large share of the acid which would have otherwise reacted adversely upon the terminal connection is spent or consumed in reaction with the metal of the shield.

When utilizing aluminum-containing shields, the acid attack results in the formation of a fluffy, shiny white deposit which is so highly visible that it captures the visual attention of an observer whether or not he is looking for it. Consequently, even the untrained observer will readily recognize that battery acid has begun to accumulate within the vicinity of the terminal connection. Because these copious fluffy, white salts are readily soluble in water they are readily washed away. A fortuitous byproduct of this washing step is the fact that battery acid in the vicinity of the deposits which has not been consumed by reaction with the metallic shield is itself washed away and thus cannot exert its normally disagreeable characteristics.

It will be seen from the foregoing that when properly affixed to the battery the shields engage in silent combat to protect the terminal connection, to lengthen useful battery life, to enhance battery reliability and to reduce corrosion which would otherwise occur. And at the same time the shield, especially if made from aluminum, provides a telltale warning that battery acid accumulation is in its early stages and that it is time to rinse the system to remove the fluffy deposits which have formed. Consequently, the devices of this invention possess a combination of useful features and factors rendering them highly workable in actual practice. Under normal service conditions, shields fabricated in accordance with this invention should last at least 2 years. However, more frequent replacement may be found desirable where more strenuous acid attack is encountered.

If desired, suitable instructions may be placed on or near the battery advising that when the fluffy white deposits appear, these should be rinsed away with water.

I claim:

1. In an acid electrolyte electric storage battery having at least one metallic terminal post extending from the casing thereof, said post being adapted to have fitted therewith a metallic connector, the improvement according to which there is snugly fitted about the base of the post in proximity to the casing a shield of a metal higher in the electromotive series than the metal of the post and of the connector.

2. The improvement of claim 1 wherein said shield is composed predominantly of aluminum or magnesium or an alloy of either or both.

3. The improvement of claim 1 wherein said shield is composed predominantly of aluminum.

4. The improvement of claim 1 wherein said shield is shaped in the form of a rectangle.

5. The improvement of claim 1 wherein the battery has two lead-containing terminal posts, each of which has fitted therewith a lead-containing or brass-containing connector, and wherein there is snugly fitted about the base of each said post in proximity to said casing a shield of aluminum or magnesium or an alloy of either or both.

6. The improvement of claim 5 wherein each said shield is made from aluminum.

7. In an acid electrolyte electric storage battery an electrical connection which comprises a lead-containing terminal post extending from the casing of the battery, a metallic connector detachably attached to said post to form a connection normally susceptible to the adverse consequences of battery acid attack, and, to reduce the severity of such adverse consequences, a generally flat, relatively thin member of a metal above lead in the electromotive series, said member having an aperture sized to effect an interference fit with the lower circumference of the terminal post and by virtue of said aperture being snugly fitted around said post between the casing and the connector.

8. The connection of claim 7 wherein said aperture is off center in said member so that a portion of said member protrudes beyond the edge of the connector.

9. The connection of claim 7 wherein said member is shaped in the form of a rectangle and said aperture is located essentially equidistantly from three sides thereof.

10. The connection of claim 7 wherein said connector is a lead-containing or brass-containing connector and wherein said member is fabricated from aluminum or magnesium or an alloy of either or both.